(12) United States Patent
Kim et al.

(10) Patent No.: US 10,319,481 B2
(45) Date of Patent: Jun. 11, 2019

(54) PASSIVE CONTAINMENT SPRAY SYSTEM

(71) Applicant: KOREA ATOMIC ENERGY RESEARCH INSTITUTE, Daejeon (KR)

(72) Inventors: Young In Kim, Daejeon (KR); Soo Jai Shin, Daejeon (KR); Han Ok Kang, Daejeon (KR); Keung Koo Kim, Daejeon (KR); Ju Hyeon Yoon, Daejeon (KR); Tae Wan Kim, Daejeon (KR); Jae Joo Ha, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1442 days.

(21) Appl. No.: 14/272,421

(22) Filed: May 7, 2014

(65) Prior Publication Data

US 2014/0334591 A1 Nov. 13, 2014

(30) Foreign Application Priority Data

May 9, 2013 (KR) .................. 10-2013-0052663

(51) Int. Cl.
*G21C 15/18* (2006.01)
*G21C 13/02* (2006.01)
(Continued)

(52) U.S. Cl.
CPC ............ *G21C 15/18* (2013.01); *G21C 13/02* (2013.01); *G21C 15/12* (2013.01); *G21D 3/06* (2013.01); *Y02E 30/40* (2013.01)

(58) Field of Classification Search
CPC ................................. G21C 15/18; G21C 19/00
See application file for complete search history.

(56) References Cited

U.S. PATENT DOCUMENTS 3,060,110 A * 10/1962 Wainrib ................. G21C 1/09
  137/207
3,168,445 A   2/1965 Ziegler et al.
(Continued)

FOREIGN PATENT DOCUMENTS

CA   1153786 A  *  9/1983  ............. G21C 9/012
CN   202102728        1/2012
(Continued)

OTHER PUBLICATIONS

Notice on the Second Office Action (translation) for CN 201410284800.0, dated Aug. 17, 2016, 14 pages.
(Continued)

*Primary Examiner* — Lily C Garner
(74) *Attorney, Agent, or Firm* — Scully Scott Murphy and Presser

(57) ABSTRACT

Provided is a passive containment spray system including: a spray coolant storage unit that communicates with a containment accommodating a reactor vessel and maintains equilibrium of pressure between the spray coolant storage unit and the containment; a spray pipe that is installed within the containment in such a manner that when an accident occurs, a coolant supplied from the spray coolant storage unit is sprayed into the containment through the spray pipe due to an increase in pressure within the containment; and a connection pipe one end of which is inserted into the spray coolant storage unit in such a manner as to provide a flow path along which the coolant flows and the other end of which is connected to the spray pipe in such a manner that the coolant is passively supplied to the spray pipe through the connection pipe therein.

9 Claims, 11 Drawing Sheets

(51) Int. Cl.
*G21C 15/12* (2006.01)
*G21D 3/06* (2006.01)

(56) References Cited

U.S. PATENT DOCUMENTS

| | | | | |
|---|---|---|---|---|
| 4,362,693 | A | * | 12/1982 | Bukrinsky ............. G21C 9/012 |
| | | | | 376/282 |
| 4,694,693 | A | * | 9/1987 | Gerlowski ............. G21C 15/18 |
| | | | | 376/207 |
| 4,717,532 | A | * | 1/1988 | Schwab .................... G21C 1/09 |
| | | | | 261/124 |
| 4,753,771 | A | * | 6/1988 | Conway ................. G21C 15/18 |
| | | | | 376/282 |
| 4,816,210 | A | | 3/1989 | Henry |
| 5,096,659 | A | | 3/1992 | Hidaka et al. |
| 5,132,076 | A | * | 7/1992 | Corpora ............... G21C 19/307 |
| | | | | 376/305 |
| 5,211,906 | A | | 5/1993 | Hatamiya et al. |
| 5,943,384 | A | | 8/1999 | Mansani et al. |

FOREIGN PATENT DOCUMENTS

| | | |
|---|---|---|
| FR | 2 468 188 | 4/1981 |
| FR | 2 473 774 | 7/1981 |
| KR | 93-003059 | 4/1993 |
| KR | 10-0238459 | 1/2000 |
| KR | 100856501 | 9/2008 |
| KR | 100856501 B1 * | 9/2008 |
| KR | 10-1242743 | 3/2013 |

OTHER PUBLICATIONS

Office Action in Korean Patent Application No. 10-2013-0052663, dated May 27, 2014, 18 pages.
Notice of the First Office Action (including translation) for CN 201410284800.0, dated Feb. 14, 2016, 27 pages.

\* cited by examiner

PASSIVE CONTAINMENT SPRAY SYSTEM

CROSS-REFERENCE TO RELATED APPLICATION

Pursuant to 35 U.S.C. § 119(a), this application claims the benefit of earlier filing date and right of priority to Korean Application No. 10-2013-0052663, filed on May 9, 2013, the contents of which is incorporated by reference herein in its entirety.

BACKGROUND OF THE DISCLOSURE

1. Field of the Disclosure

The present disclosure relates to a passive containment spray system that when an accident occurs in a nuclear power plant, sprays coolant passively into a containment, condenses steam discharged from a reactor coolant system or a secondary system of the nuclear power plant, and lowers pressure within the containment.

2. Background of the Disclosure

A nuclear reactor is categorized by a method of configuring a safety system or by an installation position of a main apparatus. First, the nuclear reactor is categorized by the method of configuring the safety system into an active nuclear reactor that uses active force such as one produced by a pump and a passive nuclear reactor that uses passive force such as force of gravity or gas pressure. Then, the nuclear reactor is categorized by the installation position of the main components into a loop type nuclear reactor (for example, a conventional pressurized water reactor) in which the main components (a steam generator, a pressurizer, a pump and the like) are installed outside of a reactor vessel and an integral nuclear reactor (for example a SMART nuclear reactor) in which the main apparatuses are installed within a reactor vessel.

A containment spray system is used as one among systems that suppress an increase in pressure when an accident, such as a loss of coolant accident or a steam line break, that causes an increase in pressure within a containment (a reactor building, a containment vessel, a safeguard vessel and the like may substitute for the containment, the containment building or the reactor building is made up of reinforced concrete, and the containment vessel or the safeguard vessel is made up of steel) occurs in the various nuclear reactors including the integral reactor. Examples of application of an active containment spray system that sprays coolant into the containment using a spray pump is a SMART nuclear reactor of KOREA, a conventional pressurized water reactor, and the like.

In addition to the containment spray system, a suppression tank or pool (a conventional boiling water reactor, U.S.A Westinghouse IRIS), a heat exchange or condenser (France SWR 1000 and India AHWR), a containment external spray and cooling (U.S.A. Westinghouse AP 1000) and the like are used as a system for suppressing the increase in pressure within the containment.

If the pressure within the containment increases due to water(evaporated) or steam discharging, in the suppression tank method, steam and air is introduced into the suppression tank due to a difference in pressure and the steam is condensed, thereby decreasing the pressure. In the heat exchanger method, the steam within the containment is condensed using a cold wall surface of a heat exchanger tube, thereby decreasing the pressure. In the spray method, the cold coolant is sprayed and the steam within the containment is condensed, thereby decreasing the pressure. In addition, in the containment external spray and cooling method, the containment vessel is cooled by spraying the coolant (applying air-cooling later) to an external wall of a steel containment vessel and the steam is condensed on an internal wall, thereby decreasing the pressure within the containment vessel.

An active spray system (internal spraying) is operated by a spray pump is used in many conventional nuclear reactors (active nuclear reactor), and a passive containment spray system (external spraying) is operated by gravity after opening an isolation valve is used in U.S.A. Westinghouse AP 1000 (passive nuclear reactor) and the like.

However, the passive containment spray system in the related art, although it has much advantages as a passive system, includes the isolation value that is operated with a driving electric power source including an operation signal and an electric power source. Thus, if failure to an actuation signal generation system or an electric power system occurs, there is a possibility that the passive containment spray system in the related art will not be operated.

SUMMARY OF THE DISCLOSURE

Therefore, an aspect of the detailed description is to provide a passive containment spray system which is operated based on a natural phenomenon such as an increase in pressure within a containment when an accident occurs. The passive containment spray system is operated without an actuation signal generation system or an electric power system for opening an isolation valve.

Another aspect of the detailed description is to provide a passive containment spray system that has much reliability to maintain integrity of a containment safely in a nuclear power plant.

To achieve these and other advantages in accordance with the purpose of this specification, as embodied and broadly described herein, there is provided a passive containment spray system including: a spray coolant storage unit that communicates with a containment accommodating a reactor vessel and maintains equilibrium of pressure with the containment; a spray pipe that is installed within the containment in such a manner that when an accident occurs, a coolant supplied from the spray coolant storage unit is sprayed into the containment through the spray pipe due to an increase in pressure within the containment; and a connection pipe having one end inserted into the spray coolant storage unit to provide a flow path along which the coolant flows, and the other end connected to the spray pipe to supply the coolant passively to the spray pipe when the pressure within the containment increases due to an occurrence of an accident and a flow of the coolant occurs therein.

In the passive containment spray system, the connection pipe may includes: an upward flow path portion inserted into the spray coolant storage unit, and providing a flow path along which the coolant flows when the pressure within the containment increases, the upward flow path extending up to a predetermined height such that the flow of the coolant from the spray coolant storage unit to the spray pipe is prevented from occurring within a normal plant operation pressure range for the containment; and a downward flow path portion extending downward from the upward flow path portion and connected to the spray pipe such that the coolant is supplied continuously to the spray pipe therethrough due to a difference of a gravitational head of water when the pressure within the containment increases and the flow of the coolant occurs at a height of the upward flow path portion or above.

In the passive containment spray system, the upward flow path portion and the downward flow path portion are configured to have different flow path areas to facilitate gas discharging.

The passive containment spray system may further include an intermediate cavity unit installed around the other end of the connection pipe to enhance the flow of the coolant that occurs in a direction from the spray coolant storage unit to the connection pipe, the intermediate cavity unit generating a difference in pressure from the spray coolant storage unit, and connected to the spray pipe to supply the coolant that passes through the connection pipe to the spray pipe.

In the passive containment spray system, the spray pipe is connected to an upper portion of the intermediate cavity unit such that the spraying of the coolant starts after the coolant level in the intermediate cavity unit reaches a predetermined height.

The passive containment spray system may further include a check valve installed in a pipe that is connected to an upper portion of the intermediate cavity unit, and opened to discharge gas within the intermediate cavity unit when pressure within the intermediate cavity unit is greater than that within the containment due to the coolant through the connection pipe.

The passive containment spray system may further include an orifice installed in the pipe to limit an amount of flowing fluid discharged through the check valve such that an amount of the flowing coolant supplied to the spray pipe is secured enough.

The passive containment spray system may further include a check valve installed in the spray pipe such that steam discharged into the containment or air is prevented from being introduced through the spray pipe into the connection pipe, the check valve being opened in a direction toward the spray pipe such that the coolant within the spray coolant storage unit flows through the spray pipe.

In the passive containment spray system, at least one of the check valves installed in the pipe connected to the upper portion of the intermediate cavity unit and the check valve installed in the spray pipe is provided in plurality to prevent the passive containment spray system from malfunctioning due to a single failure.

The passive containment spray system may further include at least one spray nozzle connected to the spray pipe to spray the coolant into the containment therethrough.

In the passive containment spray system, the spray coolant storage unit is installed at a predetermined height inside of the containment to allow for spraying of the coolant due to a gravitational head of water, and is maintained in an opened state to achieve equilibrium of pressure between the spray coolant storage unit and the containment.

In the passive containment spray system, the spray coolant storage unit is installed at a predetermined height outside of the containment such that the coolant is possible to spray due to a gravitational head of water, and an upper portion of the spray coolant storage unit is connected to the inside of the containment with a pipe to achieve equilibrium of pressure between the spray coolant storage unit and the containment.

The passive containment spray system may further include an isolation valve installed in a pipe diverged from the connection pipe, and opened and closed to prevent an occurrence of the flow of the coolant from the spray coolant storage unit based on a siphon break phenomenon when a nuclear power plant is in a normal plant operation condition, when the spray coolant storage unit is being filled with the coolant, or when the spray coolant storage unit is in maintenance.

The passive containment spray system may further include a pipe configured to connect a lower portion of the spray coolant storage unit and the spray pipe, and an isolation valve installed in the pipe and opened in case of non-operation of the system when an accident occurs.

According to another aspect of the present invention, there is provide a nuclear power plant including: a reactor vessel; a containment that is installed outside of the reactor vessel such that radioactive material is prevented from releasing from the reactor vessel to outside of the containment; and a passive containment spray system, wherein the passive containment spray system include: a spray coolant storage unit that communicates with a containment accommodating the reactor vessel and maintains equilibrium of pressure between the spray coolant storage unit and the containment, a spray pipe that is installed within the containment in such a manner that when an accident occurs, a coolant supplied from the spray coolant storage unit is sprayed into the containment through the spray pipe due to an increase in pressure within the containment building, and a connection pipe having one end inserted into the spray coolant storage unit to provide a flow path along which the coolant flows, and the other end connected to the spray pipe to supply the coolant passively to the spray pipe when the pressure within the containment increases due to an occurrence of an accident and a flow of the coolant occurs therein.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
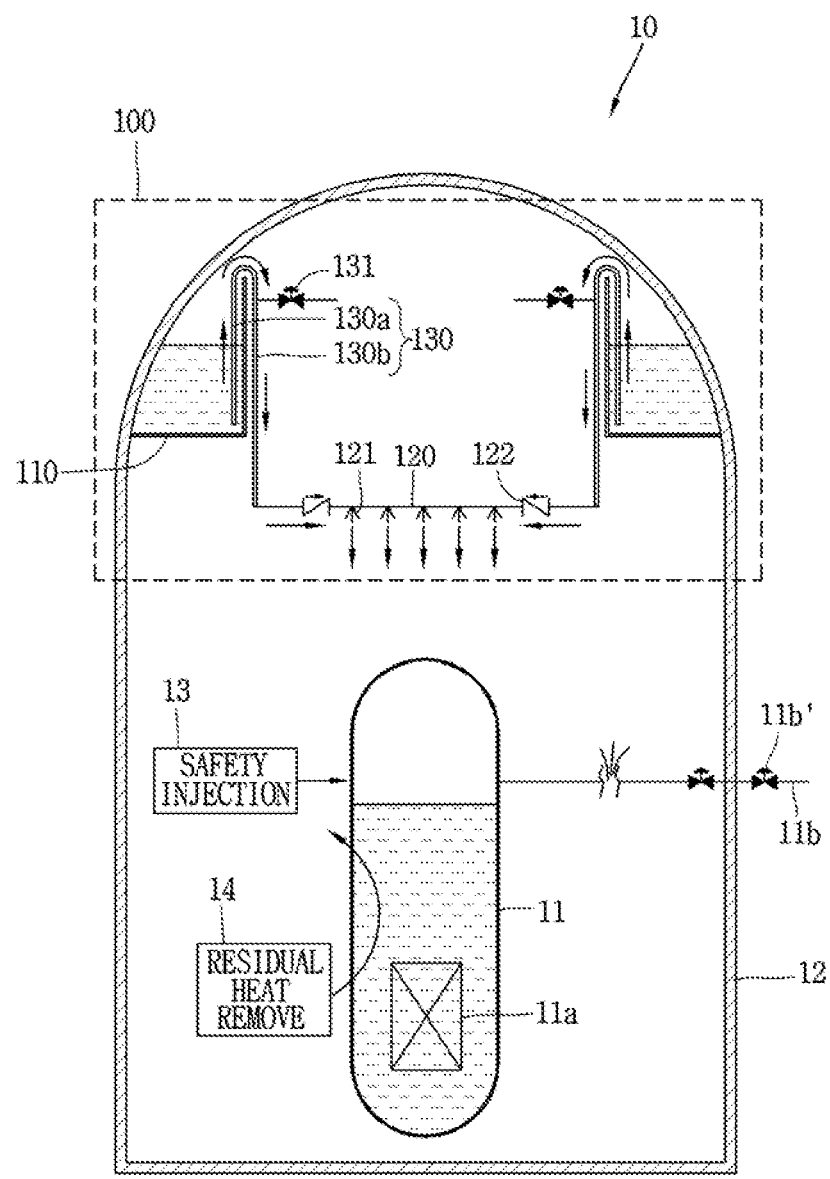
FIG. 1 is a diagram illustrating a passive containment spray system according to one embodiment of the present invention and a nuclear power plant equipped with the passive containment spray system.

Description will now be given in detail of the exemplary embodiments, with reference to the accompanying drawings. For the sake of brief description with reference to the drawings, the same or equivalent components will be provided with the same reference numbers, and description thereof will not be repeated.

A passive containment spray system according to the present invention is described in detail below referring to the drawings. In the present disclosure, if constituents according to different embodiments are the same, they are given the same reference numerals and a description of the first one substitutes for that of the next one. In the present disclosure, although in the singular number, a noun is construed as in the plural number, except as distinctively expressed in context.

FIG. 1 is a diagram illustrating a passive containment spray system 100 according to one embodiment of the present invention and a nuclear power plant 10 equipped with the passive containment spray system 100.

The nuclear power plant 10 includes various systems in such a manner that heat generated in a reactor core 11a arranged within a reactor vessel 11 is used to produce useful energy. In addition, the nuclear power plant 10 includes various safety systems for maintaining integrity of the nuclear power plant 10 against a loss of coolant accident or a non-loss of coolant. Various pipes 11b may be connected to reactor vessel 11. Isolation valves 11b' may be installed in the pipe 21b.

Along with the safety system, a containment 12 is installed outside of the reactor vessel 11 in such a manner that radioactive material is prevented from releasing from the reactor vessel 11 to outside of the containment 12. Regardless of whatever this term denotes, the containment 12 may be whatever prevents the radioactive material from releasing and may be replaced with a containment building, a containment vessel, a reactor building or a safeguard vessel according to a design characteristics of the nuclear power plant 10.

Among the safety systems, a safety injection system 13 is a system that injects coolant to within the reactor vessel 11 and thus maintains a coolant level in the reactor vessel 11, and a residual heat removal system 14 is a system that circulates coolant through the reactor vessel 11 and thus removes sensible heat of the reactor vessel 11 and residual heat of the reactor core 11a.

The passive containment spray system 100 is one of the safety systems. When an accident occurs in the nuclear power plant 10, the passive containment spray system sprays cold coolant into the containment 12 and thus cools down and condenses high-temperature steam, thereby maintaining structural integrity of the containment 12.

The passive containment spray system 100 includes a spray coolant storage unit 110, a spray pipe 120 and a connection pipe 130 in such a manner that performs an operation that is entirely based only on a natural principle without an operator's operation.

The coolant that is to be sprayed into the containment 12 is stored in the spray coolant storage unit 110, and the spray coolant storage unit 110 is installed at a predetermined height within the containment 12. In the present disclosure, the storage unit collectively refers to a tank or a pool. The coolant stored in the spray coolant storage unit 110 is sprayed into the containment 12 based on the difference of a gravitational head of water. Thus, the spray coolant storage unit 110 should be suitably installed above the reactor vessel 11 so that a proper difference in height between the spray coolant storage unit 110 and the reactor vessel 11 can be maintained to facilitate spraying.

The spray coolant storage unit 110 is formed to communicate with the containment 12 and thus maintains equilibrium of pressure with the containment 12. To allow the spray coolant storage unit 110 to communicate with the containment 12, for example, i) the spray coolant storage unit has an opening in at least one portion thereof, or ii) a hollow pipe connects the spray coolant storage unit 110 and the containment 12 such that steam or air can flow between the spray coolant storage unit 110 and the containment 12.

The spray coolant storage unit 110, unlike the one illustrated, may be installed outside of the containment 12. If the spray coolant storage unit 110 is installed outside of the containment, the equilibrium of pressure cannot be maintained between the spray coolant storage unit 110 and the containment 12 in a state where the spray coolant storage unit 110 has an opening in the upper portion thereof. Therefore, the spray coolant storage unit 110 is held airtight and is connected with the containment 12 through the pipe inserted into an upper portion of the spray coolant storage unit 110 to maintain the equilibrium of pressure between the spray coolant storage unit 110 and the containment 12 (refer to FIG. 11).

Since the equilibrium of pressure is maintained between the spray coolant storage unit 110 and the containment 12, as pressure increases within the containment 12, pressure increases within the spray coolant storage unit 110. Conversely, as the pressure decreases within the containment 12, the pressure decreases within the spray coolant storage unit 110.

The spray coolant storage unit 110, which may be termed storage tank, a coolant storage pool, or whatever might be proper, may be whatever is formed in such a manner to accommodate the coolant inside and is installed inside of or outside of the containment 12 in such a manner as to maintain a proper difference in height between the spray coolant storage unit 110 and the reactor vessel 11.

The spray pipe 120 is installed within the containment 12 in such a manner that the coolant supplied from the spray coolant storage unit 110 is sprayed into the containment 12. The spray pipe 120 should be suitably installed below the spray coolant storage unit 110 to facilitate the supplying of the coolant from the spray coolant storage unit 110 due to a gravitational head of water.

The spray nozzle 121 is connected to the spray pipe 120 in such a manner that the coolant is injected into the containment 12 through the nozzle 121. The multiple spray nozzles 121 may be connected to the spray pipe 120. A direction in which the coolant is sprayed from the spray pipe 120 differs depending to a position in which the spray nozzle 121 is installed and a direction in which the coolant is injected through the spray nozzle 121. Because of this, the direction in which the coolant is injected through the spray nozzle 121 should be suitably set in such a manner that the coolant is spread out into the containment 12 in an evenly distributed manner.

A check valve 122 may be installed in the spray pipe 120. The check valve 122 is opened by a flow that occurs in one direction and prevents the flow that occurs in the opposite direction. Accordingly, the check valve 122 prevents steam being discharged into the containment from being introduced into the spray pipe 120 and then moving toward the spray coolant storage unit 110. Conversely, when the flow of the coolant from the spray coolant storage unit 110 to the spray pipe 120 occurs, the check valve 122 is opened and thus allows the coolant being stored in the spray coolant storage unit 110 to pass through. The coolant that passes through the check valve 122 is sprayed into the containment 12 through the spray nozzle 121.

The connection pipe 130 connects between the spray coolant storage unit 110 and the spray pipe 120 in such a manner as to provide a flow path along which the coolant is supplied from the spray coolant storage unit 110 to the spray pipe 120. One end of the connection pipe 130 may be inserted into the spray coolant storage unit 110, and the other end may be connected to the spray pipe 120.

The connection pipe 130 includes an upward flow path portion 130a and a downward flow path portion 130b, in such a manner that an operation is performed differently when an accident occurs than in a normal plant operation condition. The upward flow path portion 130a is inserted into the spray coolant storage unit 110 and extends upward, and the downward flow path portion 130b extends downward from the upward flow path portion 130a.

The upward flow path portion 130a is inserted into the spray coolant storage unit 110 and provides an upward flow path along which the coolant flows. Since the equilibrium of pressure is maintained between the spray coolant storage unit 110 and the containment 12, as the pressure increases within the containment 12, the pressure increases within the spray coolant storage unit 110. As the pressure increases within the spray coolant storage unit 110, the coolant within the spray coolant storage unit 110 is pushed up along the upward flow path portion 130a.

When the nuclear power plant 10 is in the normal plant operation condition, pressure within the containment 12 is not always constant but continuously changes within a normal plant operation pressure range. Even though the pressure within the containment 12 is within the normal plant operation pressure range, when the pressure increases to some extent, the coolant within the spray coolant storage unit 110 is pressurized and thus there is a possibility that the passive containment spray system 100 will be operated. In order to remove such a possibility, the upward flow path portion 130a extends to a predetermined height above the coolant level. Therefore, the flow of the coolant from the spray coolant storage unit 110 to the spray pipe 120 is prevented from occurring within a normal plant operation pressure range for the containment 12. The predetermined height varies depending on a normal pressure range for the containment 12. As the normal pressure range increases, the upward flow path portion 130a increases in height. Accordingly, as long as the pressure within the containment 12 is within the normal plant operation pressure range, even though the pressure increases to some extent, the coolant does not flow above the highest position on the upward flow path portion 130a (a connection point between the upward flow path portion 130a and the downward flow path portion 130b). Thus, in the normal plant operation condition of the nuclear power plant 10, the flow of the coolant from the spray coolant storage unit 110 to the spray pipe 120 is prevented from occurring.

When the steam is discharged into the containment 12 by an accident, the pressure within in the containment 12 increases up to high pressure exceeding a normal pressure range. When due to the increase in the pressure within the containment 12, the flow of the coolant occurs at the height of the upward flow path portion 130a or above, the downward flow path portion 130b extends downward from the upward flow path portion 130a and is connected to the spray pipe 120 in such a manner that the coolant is continuously supplied to the spray pipe 120 due to the head difference.

The connection pipe 130 that includes the upward flow path portion 130a and the downward flow path portion 130b is for using a siphon phenomenon. When the flow occurs at the height of the upward flow path portion 130a or above due to the high-pressure steam that is discharged into the containment 12, the coolant is continuously supplied from the spray coolant storage unit 110 to the spray pipe 120 due to the head difference until the coolant is all used up.

The normal plant operation pressure range for the containment 12 and the height of the upward flow path portion 130a vary according to the design characteristics of the nuclear power plant 10. Thus, the passive containment spray system 100 can spray the coolant by properly adjusting the height of the upward flow path portion 130a, entirely based only on a natural force.

An isolation valve 131 may be installed a pipe that branches off from the connection pipe 130, in order to perform maintenance of the passive containment spray system 100 or fill the spray coolant storage unit 110 with the coolant. When the nuclear power plant 10 is in the normal plant operation condition, the isolation valve 131 is closed. At the time when the maintenance of the passive containment spray system 100 are necessary, the isolation valve 131 is opened to prevent the flow from occurring from the spray coolant storage unit 110 based on a siphon break phenomenon.

When the isolation valve 131 is opened, the equilibrium of pressure is achieved between the connection pipe 130 and the containment 12, and thus the flow of the coolant from the spray coolant storage unit 110 through the connection pipe 130 to the spray pipe 120 does not occur. Accordingly, the passive containment spray system 100 does not be operated and this makes it possible to fill the spray coolant storage unit 110 with the coolant or perform maintenance of the spray coolant storage unit 110.

The isolation valve 131 is kept closed when the nuclear power plant 10 is in the normal plant operation condition after filling the spray coolant storage unit 110 with the coolant or finishing maintenance of the spray coolant storage unit 110. The connection pipe 130 is kept filled with air whose pressure is the same as that of air within the containment, except for a portion below the coolant level in the spray coolant storage unit 110.

When an accident occurs, the passive containment spray system 100 sprays the coolant into the containment 12 and thus condenses the steam discharged into the containment 12 and suppresses an increase in pressure within the containment 12. As the passive containment spray system 100 condenses the steam within the containment 12, a radioactive material concentration decreases within the containment 12.

Figure 2:
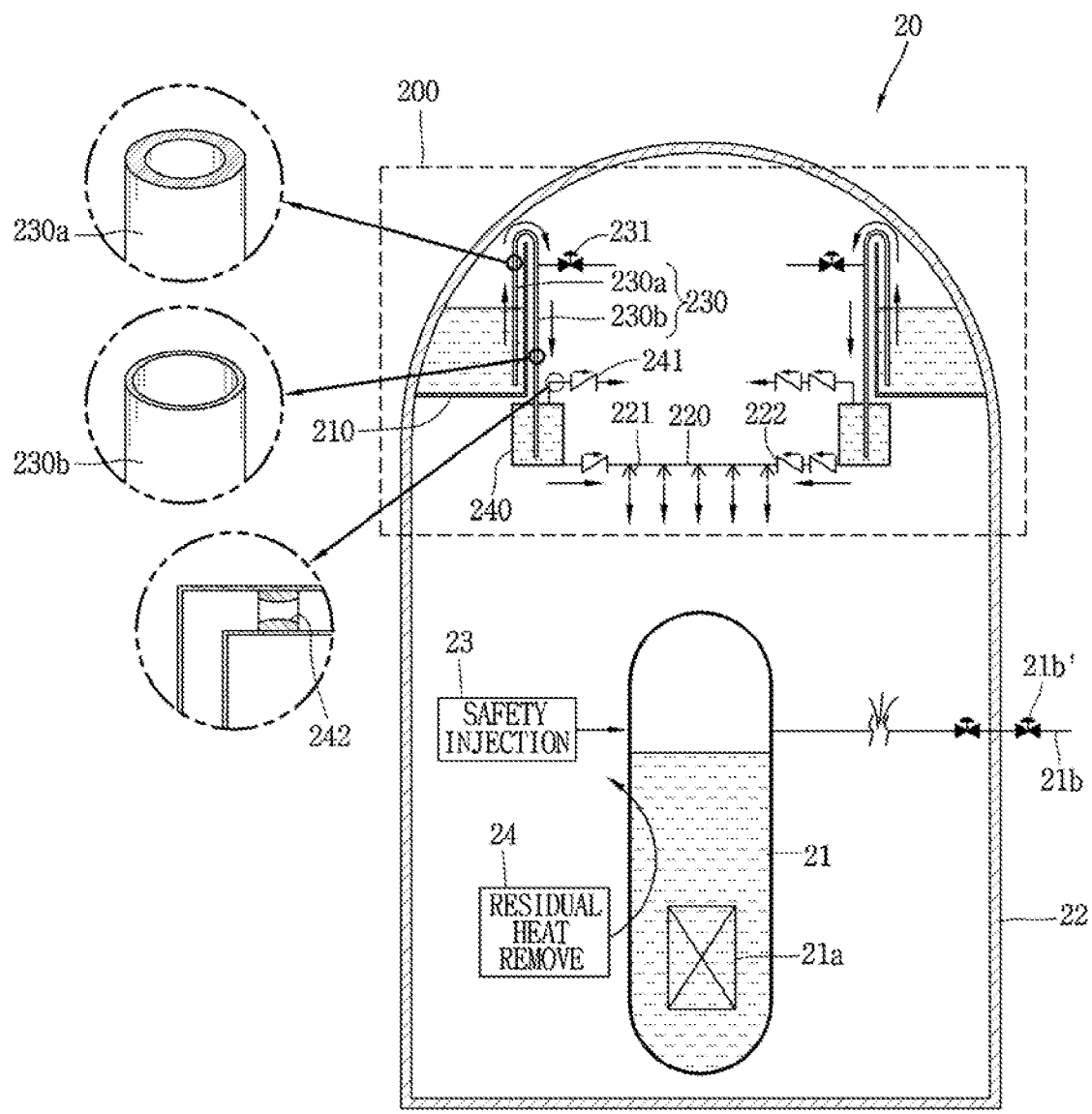
FIG. 2 is a diagram illustrating a passive containment spray system according to another embodiment of the present invention and a nuclear power plant equipped with the passive containment spray system.

FIG. 2 is a diagram illustrating a passive containment spray system 200 according to another embodiment of the present invention and a nuclear power plant 20 equipped with the passive containment spray system 200. The nuclear power plant 20 includes various systems in such a manner that heat generated in a reactor core 21a arranged within a reactor vessel 21 is used to produce useful energy.

The passive containment spray system 200 includes a spray coolant storage unit 210, a spray pipe 220, a connection pipe 230, and an intermediate cavity unit 240. An isolation valve 231 may be installed a pipe that branches off from the connection pipe 230.

The intermediate cavity unit 240 is installed around an end of a downward flow path portion 230a and generates a difference in pressure between the intermediate cavity unit 240 and the spray coolant storage unit 210, in such a manner as to enhance the flow of the coolant that occurs in the direction from the spray coolant storage unit 210 to the connection pipe 230. The occurrence of the flow from the spray coolant storage unit 210 to the spray pipe 220 is due to the siphon phenomenon. Thus, the greater difference in pressure is generated between the intermediate cavity unit 240 and the spray coolant storage unit 210, the more enhanced the flow occurring in the direction from the spray coolant storage unit 210 to the spray pipe 220.

The downward flow path portion 230a is inserted into the intermediate cavity unit 240, and the intermediate cavity unit 240 is connected to the spray pipe 220 in such a manner that the coolant that passes through the connection pipe 230 is supplied to the spray pipe 220.

As the coolant is introduced into the intermediate cavity unit 240, the coolant level in the intermediate cavity unit 240 increases and the pressure increases. A check valve 241 is installed in a pipe above the intermediate cavity unit 240 in such a manner that when pressure within the intermediate cavity unit 240 is greater than that within a containment 22 due to the coolant introduced through the connection pipe 230, gas within the intermediate cavity unit 240 is discharged.

Fluid that is discharged through the check valve 241 from the intermediate cavity unit 240 remains in a gas phase until before the coolant level reaches a full coolant level, but when the coolant level reaches the full coolant level, is discharged in a liquid phase. The liquid that is discharged through the check valve is very small in amount. As the fluid is discharged in the gas phase, a single liquid phase flow state of the coolant is maintained between the spray coolant storage unit 210, the intermediate cavity unit 240, and the spray pipe 220. Since the single phase flow state is maintained, a function of spraying due to the siphon phenomenon can be maintained even though the pressure within the containment 22 increases or decreases.

The normal plant operation condition of the nuclear power plant 20 illustrated in FIG. 2 is described below referring to FIG. 3. Operation of the passive containment spray system 200 that is performed when an accident occurs is described step by step below referring to FIGS. 4 to 8.

Figure 3:
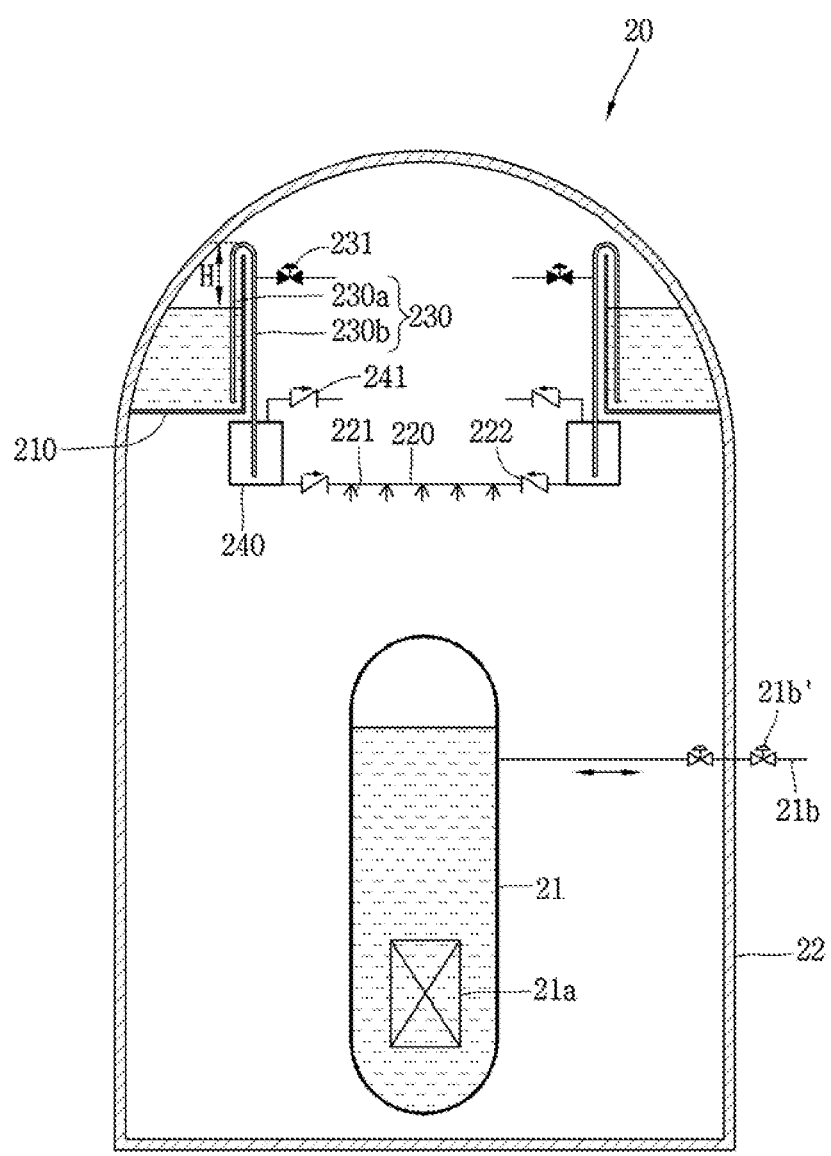
FIG. 3 is a diagram illustrating the passive containment spray system illustrated in FIG. 2 in the normal plant operation condition and the nuclear power plant equipped with the passive containment spray system.

FIG. 3 is a diagram illustrating the passive containment spray system 200 illustrated in FIG. 2 in the normal plant operation condition and the nuclear power plant 20 equipped with the passive containment spray system 200.

Various pipes 21b are connected to a reactor vessel 21. The pipes 21b are required to operate in the normal plant operation condition of the nuclear power plant 20. Isolation valves 21b' installed in the pipe 21b are opened.

The coolant is stored in the spray coolant storage unit 210, but there is a height difference H between an upward flow path portion 230a of the connection pipe 230 and the coolant level in the spray coolant storage unit 210. Therefore, even though the pressure within the containment 22 changes within the normal plant operation pressure range, the pressure does not increase enough to overcome the height difference H. Because of this, the passive containment spray system 200 does not be operated. Accordingly, a case where in the spray system in the related art, the isolation valve malfunctions while the nuclear power plant 20 is in the normal plant operation condition and the operation of the spray system starts is fundamentally excluded.

As long as the coolant is not supplied from the spray coolant storage unit 210, the intermediate cavity unit 240 is empty. Therefore, the equilibrium of pressure is maintained between the spray coolant storage unit 210 and the containment 22, and the intermediate cavity unit 240 is filled with air whose pressure is the same as that within the containment 22 under a normal plant operation condition. Thus, under the normal plant operation condition for the nuclear power plant 20, the equilibrium of pressure is maintained between the spray coolant storage unit 210, the intermediate cavity unit 240, and the containment 22.

Figure 4:
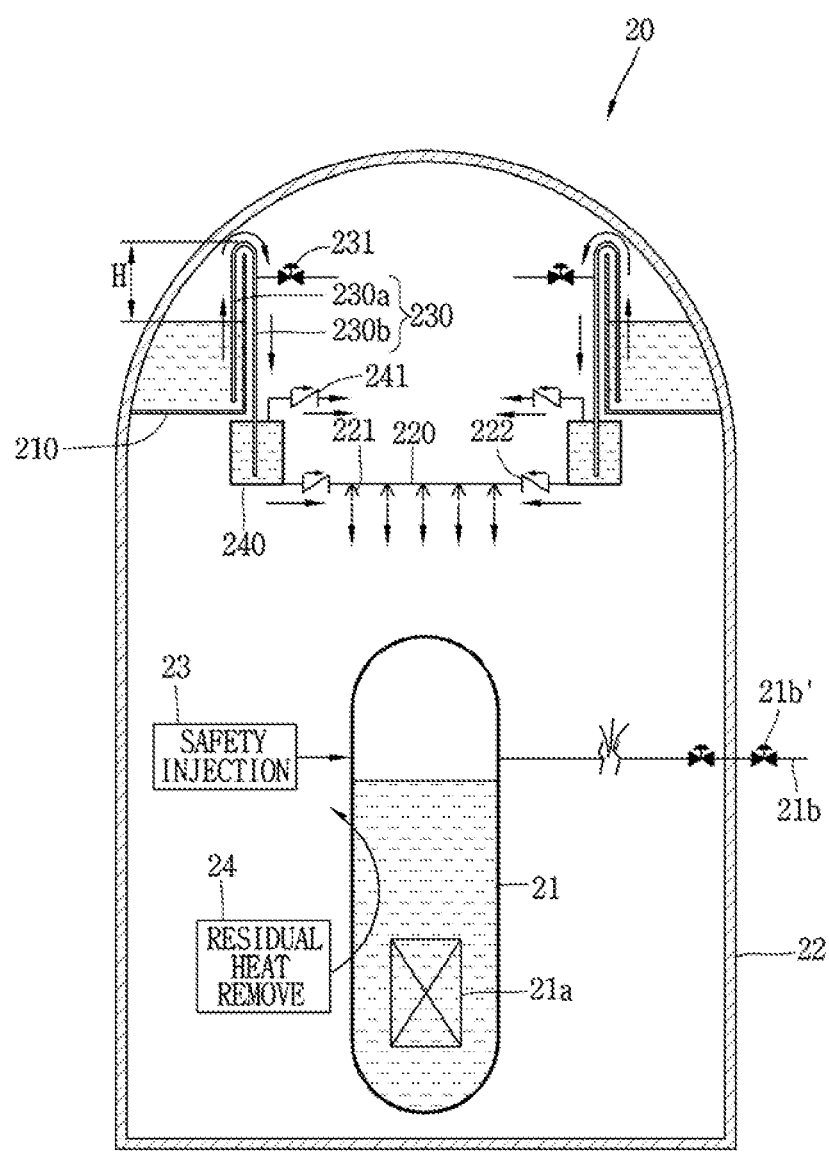
FIG. 4 is a diagram for describing operation of the passive containment spray system that is performed when a loss of coolant accident occurs in the nuclear power plant illustrated in FIG. 2.

FIG. 4 is a diagram for describing operation of the passive containment spray system 200 that is performed when the loss of coolant accident occurs in the nuclear power plant 20 illustrated in FIG. 2.

When an accident, such as a steam line break or a loss of coolant accident occurs in the nuclear power plant 20, a safety injection system 23 and a residual heat removal system 24 are operated according to an actuation signal of an associated system.

If when an accident, such as the steam line break or the loss of coolant accident occurs, the coolant (evaporated) or the steam is discharged into the containment 22 through a break portion, the temperature or the pressure within the containment 22 increase. The coolant is introduced into the connection pipe 230 due to the increase in the pressure within the containment 22 and thus the coolant level in the upward flow path portion 230a gradually increases.

Unlike in the normal plant operation condition of the nuclear power plant 20, when the pressure within the containment 22 exceeds the normal plant operation pressure range, the coolant level in the upward flow path portion 230a goes over an bent portion of the connection pipe 230 and thus the flow of the coolant that passes through the downward flow path portion 230b of the connection pipe 230 occurs. Cutouts on the left of FIG. 2 show different cross-sectional areas between the upward path portion 230a and downward path portion 230b.

The intermediate cavity unit 240 is gradually filled with the coolant that is introduced from the spray coolant storage unit 210 into connection pipe 230. When the flow occurs in the direction of the spray pipe 220 due to the coolant with which the intermediate cavity unit 240 is filled, a check value 222 installed in the spray pipe 220 is opened. The coolant that passes through the spray pipe 220 is injected through the spray nozzle 221 into the containment 22.

As the coolant level in the intermediate cavity unit 240 is gradually raised, the difference of pressure between the intermediate cavity unit 240 and the containment 22 decreases gradually. When the pressure within the intermediate cavity unit 240 increases higher than that within the containment 22, the check valve 241 that is installed in the pipe above the intermediate cavity unit 240 is opened and thus gas within the intermediate cavity unit 240 is discharged. When the gas within the intermediate cavity unit 240 is discharged, the single phase flow state between the spray coolant storage unit 210, the intermediate cavity unit 240, and the spray pipe 220 is maintained. Since the single phase flow state is maintained, even though the pressure within the containment 22 changes (decreases or increases), the flow of the coolant due to the siphon phenomenon can be maintained. An orifice 242 for limiting an amount of fluid may be installed in the pipe in which the check valve 241 above the intermediate cavity unit 240 is installed, accordingly, the amount of fluid that is discharged through the check valve 241 is limited and the amount of fluid that is sprayed through the spray pipe 220 is effectively formed.

Figure 5:
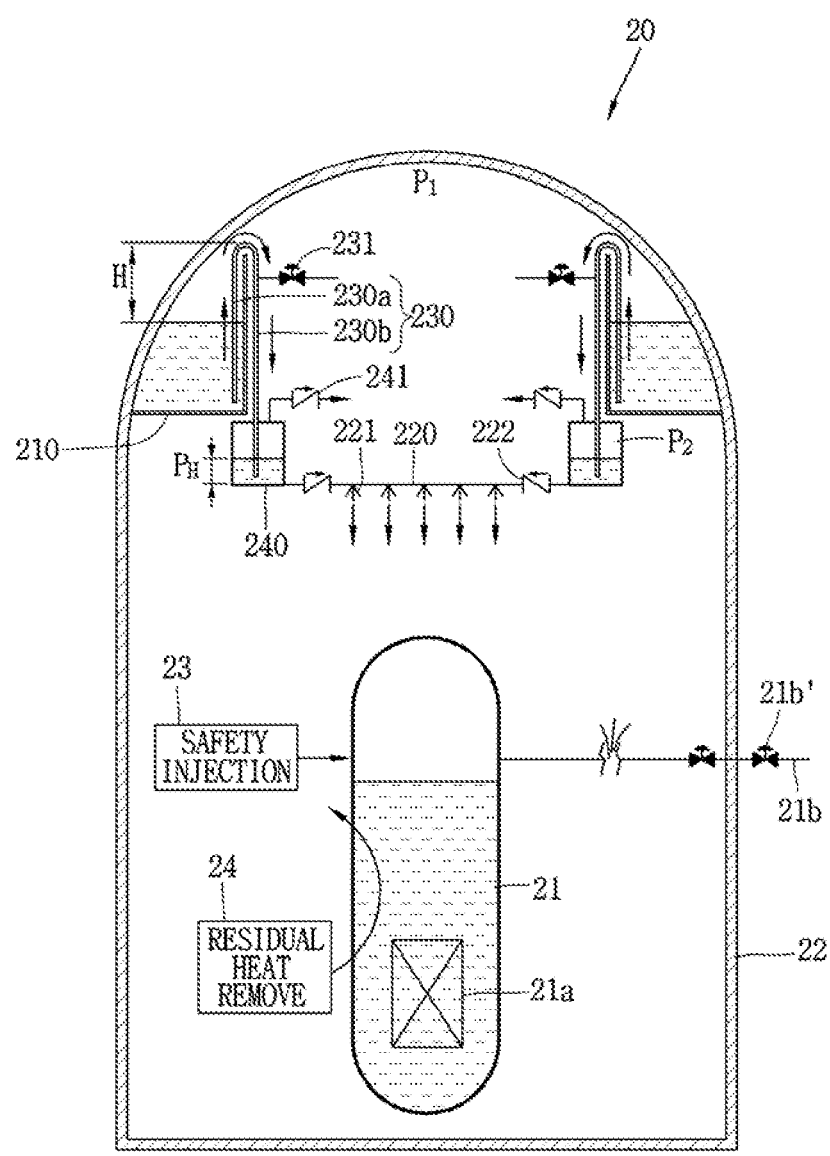
FIG. 5 is a diagram for describing a step of filling an intermediate cavity unit with coolant when a loss of coolant accident occurs in the nuclear power plant equipped with the passive containment spray system that are illustrated in FIG. 2.

FIG. 5 is a diagram for describing a step of filling the intermediate cavity unit 240 with the coolant when a loss of coolant accident occurs in the nuclear power plant 20 equipped with the passive containment spray system 200 that are illustrated in FIG. 2.

When pressure $P_1$ within the containment 22 increases and thus the coolant is introduced from the spray coolant storage unit 210 through the connection pipe 230 into the intermediate cavity unit 240, pressure $P_2$ within the intermediate cavity unit 240 increases. Then, the coolant level in the intermediate cavity unit 240 increases gradually and thus a gravitational head of water $P_H$ is formed.

However, when the pressure $P_1$ within the containment 22 is greater than a sum $P_T$ (=$P_2$+$P_H$) of the pressure $P_2$ within the intermediate cavity unit 240 and the gravitational head of water $P_H$ in the intermediate cavity unit 240 ($P_1$>$P_T$), the check valve 222 is not opened.

Even though the check valve 222 is not opened, the coolant that passes through the connection pipe 230 is continuously introduced into the intermediate cavity unit 240, and the pressure P2 within the intermediate cavity unit 240 and the gravitational head of water PH in the intermediate cavity unit 240 increase gradually.

Figure 6:
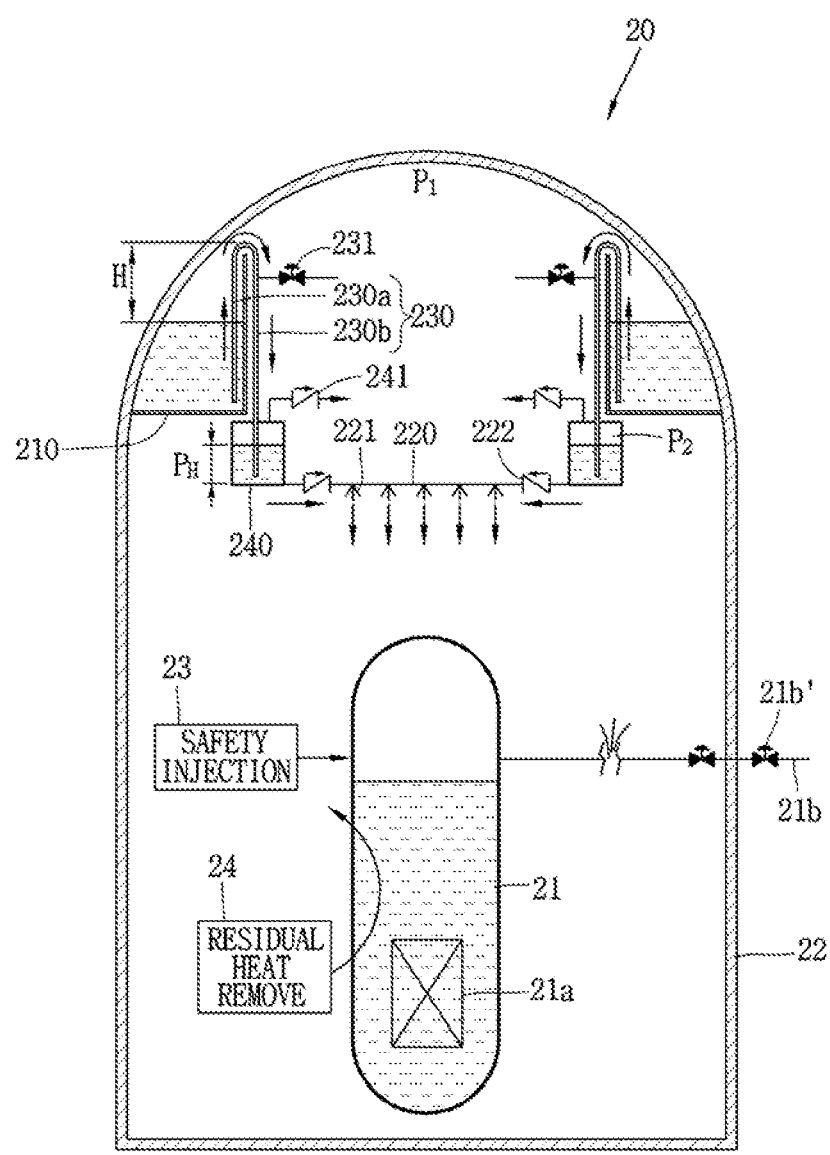
FIG. 6 is a diagram for describing a spraying step that is performed by the passive containment spray system, which is subsequent to the step that is described in FIG. 5.

FIG. 6 is a diagram for describing a spraying step that is performed by the passive containment spray system 200, which is subsequent to the step that is described in FIG. 5.

The coolant is gradually introduced from the spray coolant storage unit 210 through the connection pipe 230 into the intermediate cavity unit 240. The sum PT (P2+PH) of the pressure P2 within the intermediate cavity unit 240 and the gravitational head of water PH in the intermediate cavity unit 240 is greater than the pressure P1 within the containment 22 (P1<PT), the check valve 222 installed in the spray pipe 220 is opened. Accordingly, the coolant flows through the spray pipe 220 and the spraying of the coolant into the containment 22 through the spray nozzle 221 starts.

The steam discharged into the containment 22 is condensed by the operation of the passive containment spray system 200 and thus the increase in the pressure within the containment 22 is suppressed.

Figure 7:
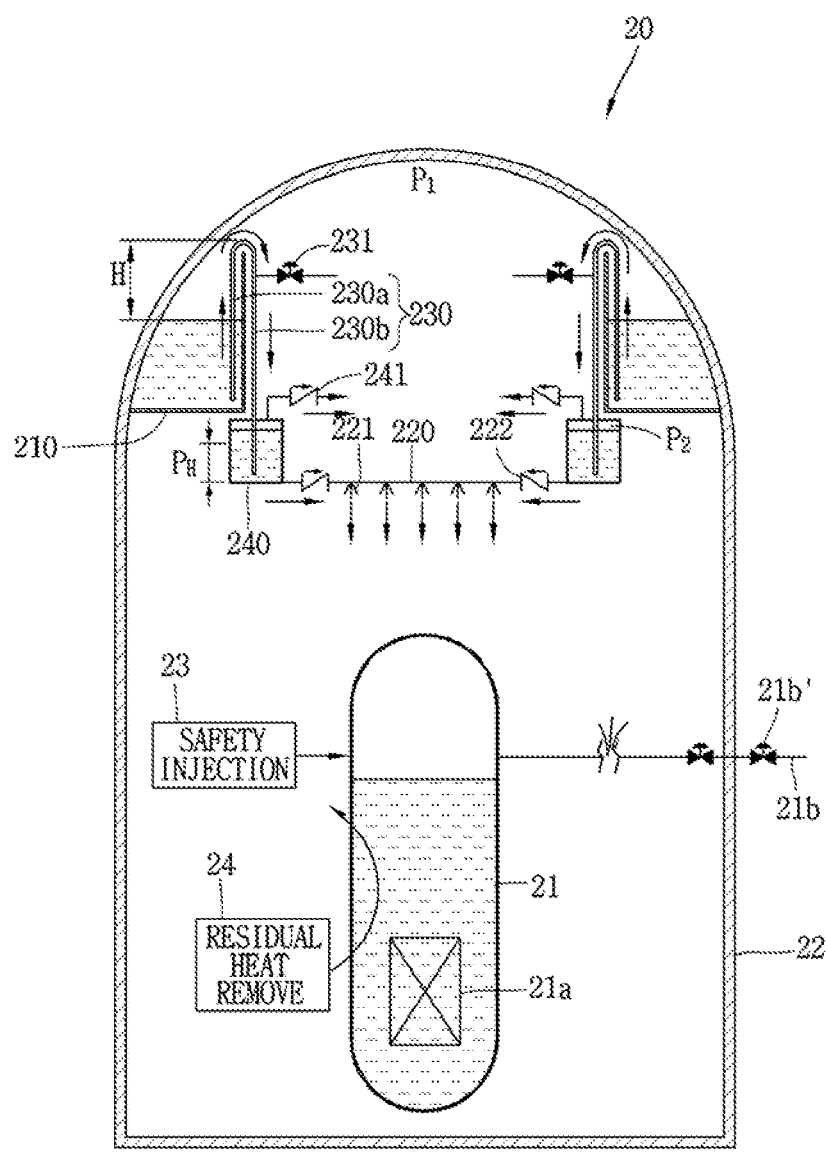
FIG. 7 is a diagram for describing a gas-discharging operation step that is performed by the intermediate cavity unit, which is subsequent to the step described in FIG. 6.
Figure 8:
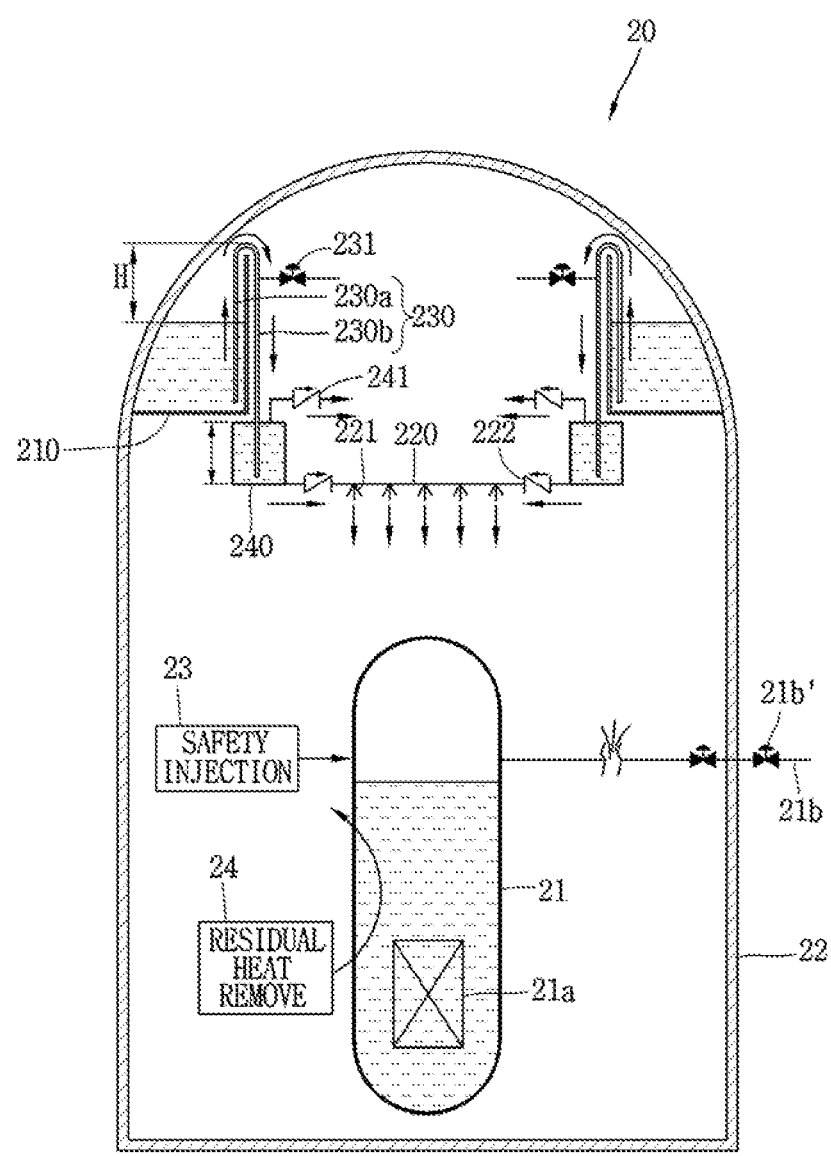
FIG. 8 is a diagram for describing a coolant-discharging operation step that is performed by the intermediate cavity unit, which is subsequent to the step described in FIG. 7.

FIG. 7 is a diagram for describing a gas-discharging operation step that is performed by the intermediate cavity unit 240, which is subsequent to the step described in FIG. 6. FIG. 8 is a diagram for describing a coolant-discharging operation step that is performed by the intermediate cavity unit 240, which is subsequent to the step described in FIG. 7.

The coolant from the spray pipe 220 continues to be sprayed, and the coolant introduced through the connection pipe 230 increases the pressure P2 within the intermediate cavity unit 240 and raises the coolant level in the intermediate cavity unit 240. When the pressure P2 within the intermediate cavity unit 240 is greater than the pressure P1 within the containment 22, the check valve 241 is opened that is installed in the pipe above the intermediate cavity unit 240.

Referring to FIG. 7, gas (air) within the intermediate cavity unit 240 is discharged through the check valve 241 until before the coolant level in the intermediate cavity unit 240 is highest. Referring to FIG. 8, the coolant level in the intermediate cavity unit 240 reaches the full coolant level and the liquid (coolant) within the intermediate cavity unit 240 is discharged through the check valve 241. The orifice is installed in the pipe in which the check valve 241 is installed, in such a manner that the amount of fluid being discharged through the check valve 241 is throttled and thus the amount fluid being discharged through the spray pipe 220 is secured enough.

When most of all the gas is discharged from the intermediate cavity unit 240, the single phase flow state of being filled with the liquid (coolant) is maintained between the spray coolant storage unit 210, the intermediate cavity unit 240, and the spray pipe 220. Since the single phase flow state is maintained, even though the pressure within the containment 22 changes (decreases or increases), the flow of the coolant due to the siphon phenomenon can be maintained. Accordingly, the passive containment spray system 200 can continuously spray the coolant into the containment 22.

The spraying of the coolant by the passive containment spray system 200 proceeds continuously until the coolant within the spray coolant storage unit 210 and the intermediate cavity unit 240 are almost used up. The increase in the pressure within the containment 22 is suppressed until the operation of the passive containment spray system 200 is stopped due to the using-up of the coolant.

The passive containment spray system 200 is operated at an early stage of an accident, such as the steam line break or the loss of coolant accident, in which the pressure within the containment 22 increases comparatively abruptly, and thus protects the containment 22. However, the coolant is used up and thus the passive containment spray system stops the operation at a middle or latter stage in which an amount of discharge of the steam decreases.

However, because there is a large space available within an upper portion of the containment 22, the operation time can be extended depending on the design capacity of the spray coolant storage unit 210.

Figure 9:
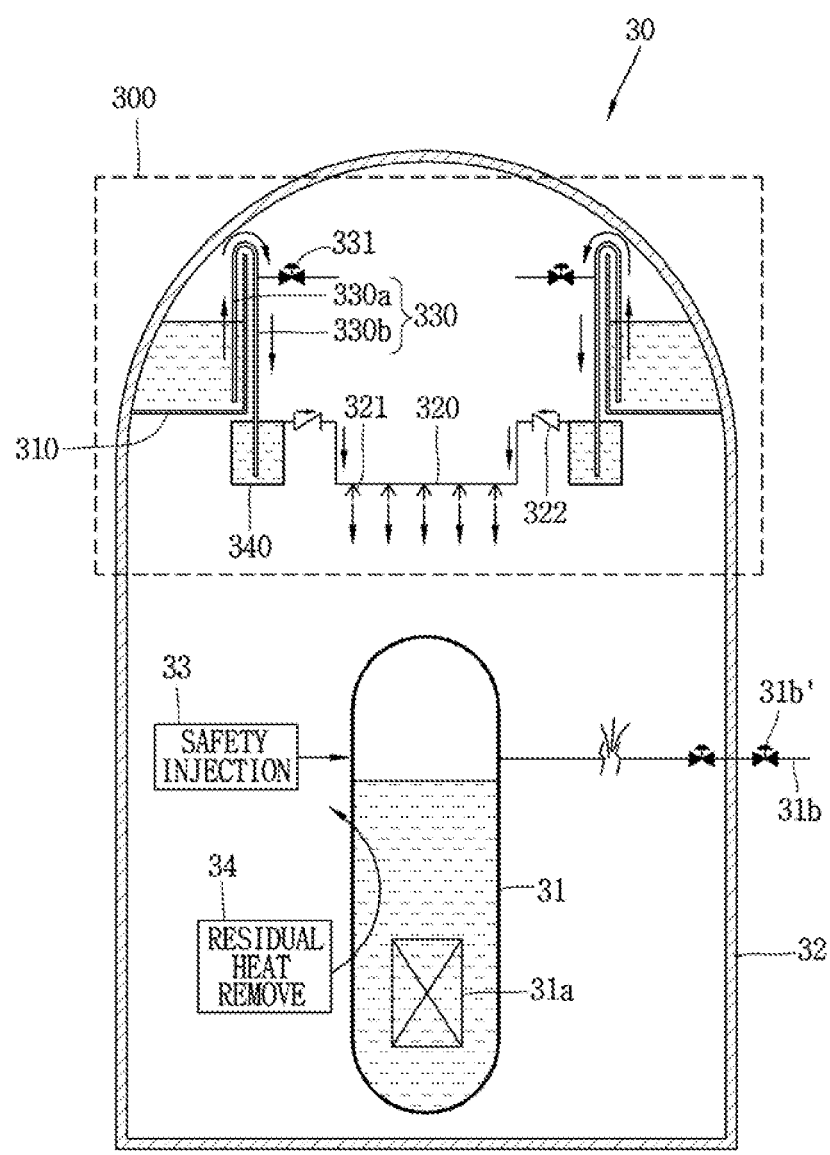
FIG. 9 is a diagram illustrating a passive containment spray system according to another embodiment of the present invention and a nuclear power plant equipped with the passive containment spray system.

FIG. 9 is a diagram illustrating a passive containment spray system 300 according to another embodiment of the present invention and a nuclear power plant 30 equipped with the passive containment spray system 300. The nuclear power plant 30 includes various systems in such a manner that heat generated in a reactor core 31a arranged within a reactor vessel 31 is used to produce useful energy. Among the safety systems, a safety injection system 33 may be a system that injects coolant to within the reactor vessel 31 and a residual heat removal system 34 may be a system that circulates coolant through the reactor vessel 31. Various pipes 31b may be connected to reactor vessel 31. Isolation valves 31b' may be installed in the pipe 31b.

The passive containment spray system 300 may include a spray coolant storage unit 310, a spray pipe 320 and a connection pipe 330. An isolation valve 331 may be installed in a pipe that branches off from the connection pipe 330. Unlike in the normal plant operation condition of the nuclear power plant 30, when the pressure within the containment 32 exceeds the normal plant operation pressure range, the coolant level in the upward flow path portion 330a goes over a bent portion of the connection pipe 330 and thus the flow of the coolant that passes through the downward flow path portion 330b of the connection pipe 330 occurs. The spray pipe 320 is connected to an upper portion of the intermediate cavity unit 340 in such a manner that the coolant in the intermediate cavity unit 340 reaches a predetermined level and then the spraying of the coolant starts. As illustrated in FIG. 9, when the spray pipe 320 is connected to the uppermost portion of the intermediate cavity unit 340, the coolant level in the intermediate cavity unit 340 is raised and thus the gas (air) within the intermediate cavity unit 340 passes first through the spray pipe 320 and is discharged into a containment 32. Then, after the intermediate cavity unit 340 reaches the full coolant level, the coolant passes through the spray pipe 320 and is sprayed into the containment 32. When the flow occurs in the direction of the spray pipe 320 due to the coolant with which the intermediate cavity unit 340 is filled, a check value 322 installed in the spray pipe 320 is opened. The coolant that passes through the spray pipe 320 is injected through the spray nozzle 321 into the containment 32.

When the spray pipe 320 is connected to the upper portion of the intermediate cavity unit 340, the gas is first discharged from the intermediate cavity unit 340, and thus the passive containment spray system 300 can be operated continuously without being provided with the separate check value for discharging the gas within the intermediate cavity unit 340.

Figure 10:
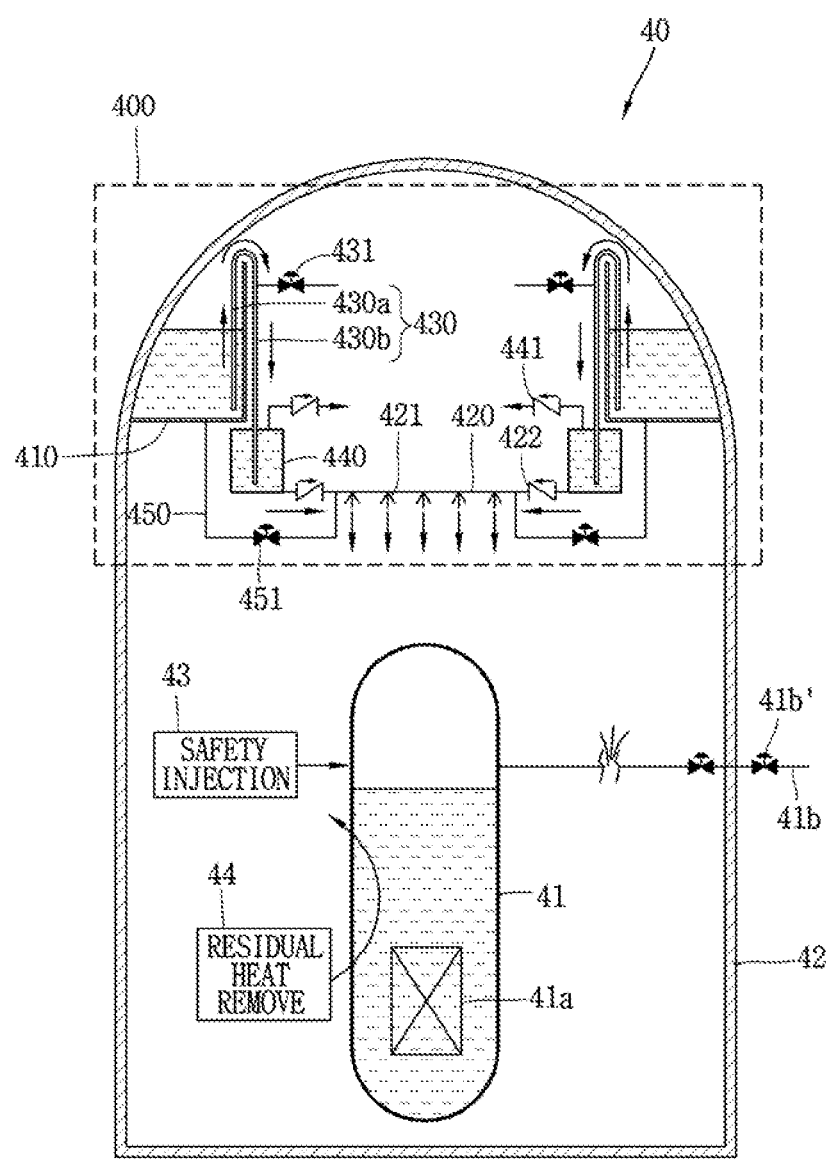
FIG. 10 is a diagram illustrating a passive containment spray system according to another embodiment of the present invention and a nuclear power plant equipped with the passive containment spray system.

FIG. 10 is a diagram illustrating a passive containment spray system 400 according to another embodiment of the present invention and a nuclear power plant 40 equipped with the passive containment spray system 400. The nuclear power plant 40 includes various systems in such a manner that heat generated in a reactor core 41a arranged within a reactor vessel 41 is used to produce useful energy. Among the safety systems, a safety injection system 43 may be a system that injects coolant to within the reactor vessel 41 and a residual heat removal system 44 may be a system that circulates coolant through the reactor vessel 41. Various pipes 41b may be connected to reactor vessel 41. Isolation valves 41b' may be installed in the pipe 41b. The passive containment spray system 400 may include a connection pipe 430. An isolation valve 431 may be installed in a pipe that branches off from the connection pipe 430. Unlike in the normal plant operation condition of the nuclear power plant 40, when the pressure within the containment 42 exceeds the normal plant operation pressure range, the coolant level in the upward flow path portion 430a goes over a bent portion of the connection pipe 430 and thus the flow of the coolant that passes through the downward flow path portion 430b of the connection pipe 430 occurs. When the flow occurs in the direction of the spray pipe 420 due to the coolant with which the intermediate cavity unit 440 is filled, a check value 422 installed in the spray pipe 420 is opened. A check valve 441 may be installed in a pipe above the intermediate cavity unit 440.

The passive containment spray system 400 includes a pipe 450 that connects between the lower portion of a spray coolant storage unit 410 and a spray pipe 420 and an isolation value 451 that is installed in the pipe 450.

Since the passive containment spray system 400 is operated entirely based on a natural phenomenon, it is not possible to completely remove a possibility that an unexpected malfunction or non-operation will occur. In order to handle the unexpected non-operation, the passive containment spray system 400 includes the isolation value 451 that can be opened in case of the non-operation of the system when an accident occurs.

When the isolation value 451 is opened, due to the gravitational head of water the coolant is supplied directly from the spray coolant storage unit 410 to the spray pipe 420 and is sprayed through a spray nozzle 421 into a containment 42.

Figure 11:
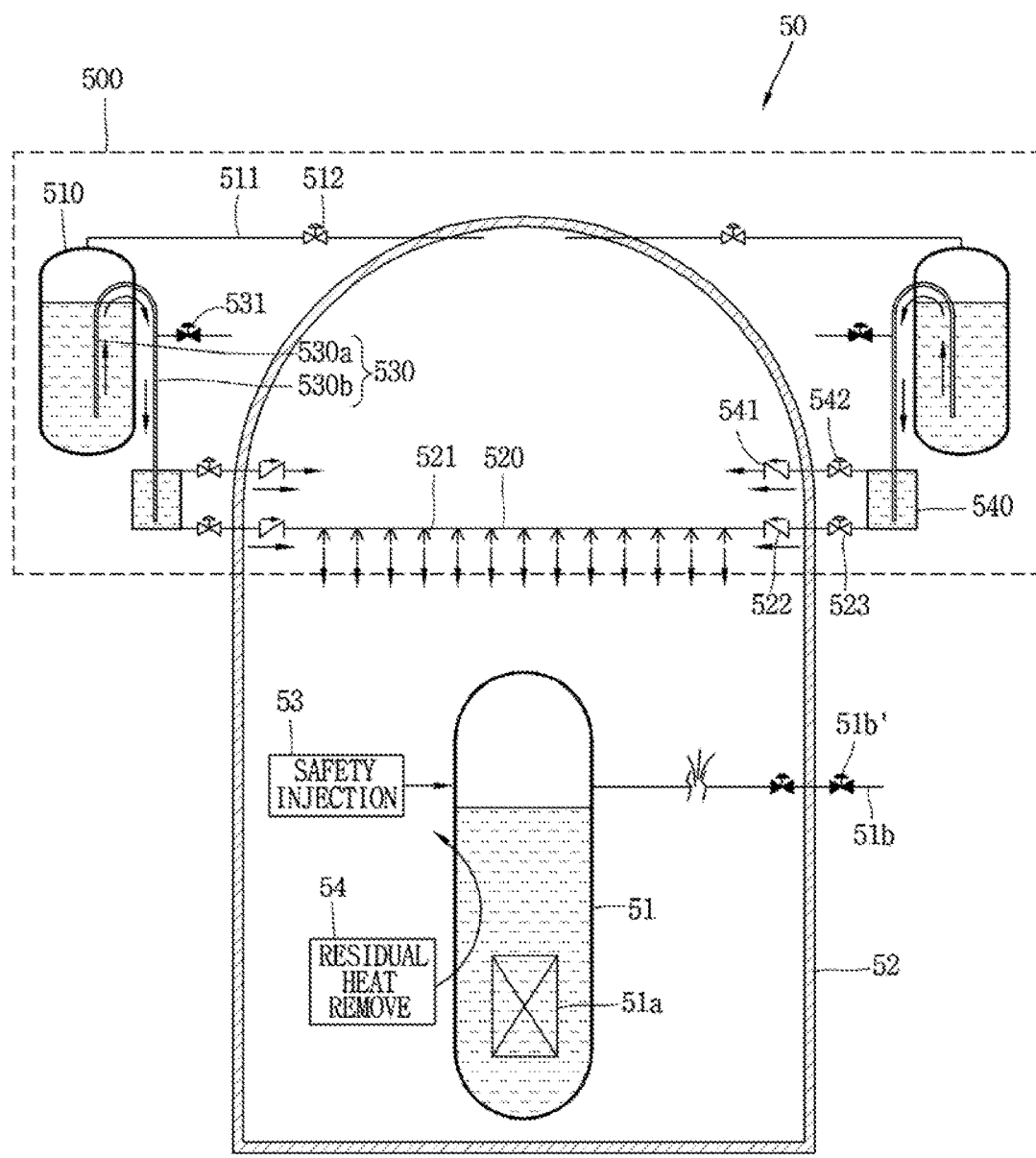
FIG. 11 is a diagram illustrating a passive containment spray system according to another embodiment of the present invention and a nuclear power plant equipped with the passive containment spray system.

FIG. 11 is a diagram illustrating a passive containment spray system 500 according to another embodiment of the present invention and a nuclear power plant 50 equipped with the passive containment spray system 500. The nuclear power plant 50 includes various systems in such a manner that heat generated in a reactor core 51a arranged within a reactor vessel 51 is used to produce useful energy. Among the safety systems, a safety injection system 53 may be a system that injects coolant to within the reactor vessel 51 and a residual heat removal system 54 may be a system that circulates coolant through the reactor vessel 51. Various pipes 51b may be connected to reactor vessel 51. Isolation valves 51b' may be installed in the pipe 51b.

A spray coolant storage unit 510 is installed at a predetermined height outside of a containment 52 in such a manner that the coolant can be sprayed due to the gravitational head of water, and is connected to the inside of the containment 52 with a pipe 511 in such a manner that the equilibrium of pressure is achieved.

An isolation valve 512 may be in the pipe 511 that connects between the spray coolant storage unit 510 and the containment 52. The isolation valve 512 is normally opened, but can be closed if necessary for the isolation when the maintenance of a passive containment spray system 500 is performed or when an accident and a break of the pipe 511 for the spray system occur at the same time.

An intermediate cavity unit 540, as illustrated, is also installed outside of the containment 52, but the intermediate cavity unit 540 may be installed inside of the containment 52. In this case, a connection pipe 530 may pass through the containment 52 in order to connect between the spray coolant storage unit 510 outside of the containment 52 and the intermediate cavity unit 540 inside of the containment 52. An isolation valve 531 may be installed in a pipe that branches off from the connection pipe 530. Unlike in the normal plant operation condition of the nuclear power plant 50, when the pressure within the containment 52 exceeds the normal plant operation pressure range, the coolant level in the upward flow path portion 530a goes over a bent portion of the connection pipe 530 and thus the flow of the coolant that passes through the downward flow path portion 530b of the connection pipe 530 occurs. When the flow occurs in the direction of the spray pipe 520 due to the coolant with which the intermediate cavity unit 540 is filled, a check value 522 installed in the spray pipe 520 is opened. The coolant that passes through the spray pipe 520 is injected through the spray nozzle 521 into the containment 52. A check valve 541 may be installed in a pipe above the intermediate cavity unit 540.

Isolation valves 523 and 542 may be installed also in the pipes that are connected to the intermediate cavity unit 540, respectively, and may be closed if necessary when the maintenance is performed or when an accident and a break of the pipe associated with the spray occur at the same time.

A position and a height at which the spray coolant storage unit 510 or the intermediate cavity unit 540 is installed are differently determined according to the design characteristics of a nuclear power plant 50.

The passive containment spray system and the nuclear power plant equipped with the passive containment spray system, which are described, are not limited to the configurations and manners of the embodiments described above, but all of or some of the embodiments may be selectively combined with each other to achieve various modifications to the embodiments.

According to the present invention with the configurations described above, when an accident occurs, if the pressure within the containment increases to a predetermined value or above, the passive containment spray system can be operated entirely based only on a natural force without receiving any actuation signal. This can improve reliability of the system.

According to the present invention, a probability that the passive containment spray system will be operated is increased. Thus, the integrity of the containment can be maintained more safely, and the safety of the nuclear power plant can be improved.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A passive containment spray system comprising:
   a spray coolant storage unit installed within a containment accommodating a reactor vessel and configured to store coolant and air therein, the air within the spray coolant storage unit fluidly communicates with air within the containment such that the spray coolant storage unit maintains equilibrium of pressure with the containment;
   a spray pipe that is installed within the containment in such a manner that when an accident occurs, the coolant supplied from the spray coolant storage unit is sprayed into the containment through the spray pipe due to an increase in pressure within the containment;
   a connection pipe having one end inserted into the spray coolant storage unit to provide a flow path along which the coolant flows, and the other end connected to the spray pipe to supply the coolant passively to the spray pipe when the pressure within the containment increases due to an occurrence of an accident and a flow of the coolant occurs therein, and
   a check valve installed in the spray pipe such that steam discharged into the containment or air is prevented from being introduced through the spray pipe into the connection pipe, the check valve being opened in a direction toward the spray pipe by a flow of the coolant from the spray coolant storage unit such that the coolant within the spray coolant storage unit flows through the spray pipe, wherein
   the connection pipe includes:
   an upward flow path portion inserted into the spray coolant storage unit and extending up to a predetermined height such that the flow of the coolant from the spray coolant storage unit to the spray pipe is prevented from occurring within a normal plant operation pressure range for the containment; and
   a downward flow path portion extending downward from the upward flow path portion and connected to the spray pipe such that the coolant is supplied continuously to the spray pipe therethrough due to a difference of a gravitational head of water, and
   the check valve is configured to form a pressure difference between an inside of the connection pipe and a target space of spraying in the containment until the check valve is opened when the flow of coolant occurs at a height of the upward flow path portion or above,
   the passive containment spray system further comprises:
   a diverged pipe having one end connected to the downward flow path portion and the other end exposed to air; and
   an isolation valve installed in the diverged pipe, and configured to be opened by an operator to prevent an occurrence of the flow of the coolant from the spray coolant storage unit by forming an equilibrium of pressure between an inside of the connection pipe and an outsider of the connection pipe when a nuclear power plant is in a normal plant operation condition, or when the spray coolant storage unit is in maintenance,
   an intermediate cavity unit installed around the other end of the connection pipe to enhance the flow of the coolant that occurs in a direction from the spray coolant storage unit to the connection pipe, the intermediate cavity unit generating a difference in pressure from the spray coolant storage unit, and connected to the spray pipe to supply the coolant that passes through the connection pipe to the spray pipe,
   wherein the spray coolant storage unit and the intermediate cavity unit do not share a common wall.

2. The passive containment spray system of claim 1, wherein
   the upward flow path portion is configured to provide a flow path along which the coolant flows when the pressure within the containment increases; and
   the downward flow path portion is configured to provide a flow path along which the coolant flows when the pressure within the containment increases and the flow of the coolant occurs at the height of the upward flow path portion or above.

3. The passive containment spray system of claim 2, wherein a cross-sectional area provided in the upward flow path portion and a cross-sectional area provided in the downward flow path portion are different from each other to facilitate discharging of gas that is filled in the connection pipe.

4. The passive containment spray system of claim 1, further comprising a check valve installed in a pipe that is connected to an upper portion of the intermediate cavity unit, and opened to discharge gas within the intermediate cavity unit when pressure within the intermediate cavity unit is greater than that within the containment due to the coolant through the connection pipe.

5. The passive containment spray system of claim 4, further comprising an orifice installed in the pipe to limit an amount of flowing fluid discharged through the check valve.

6. The passive containment spray system of claim 4, wherein at least one of the check valve installed in the pipe connected to the upper portion of the intermediate cavity unit and the cheek valve installed in the spray pipe is provided in plurality to prevent the passive containment spray system from malfunctioning due to a single failure.

7. The passive containment spray system of claim 1, further comprising at least one spray nozzle connected to the spray pipe to spray the coolant into the containment therethrough.

8. The passive containment spray system of claim 1, wherein the spray coolant storage unit is installed at a predetermined height inside of the containment to allow for spraying of the coolant due to a gravitational head of water, and is maintained in an opened state to achieve equilibrium of pressure between the spray coolant storage unit and the containment.

9. A nuclear power plant comprising:
a reactor vessel;
a containment that is installed outside of the reactor vessel such that radioactive material is prevented from releasing from the reactor vessel to outside of the containment; and
a passive containment spray system,
wherein the passive containment spray system includes:
a spray coolant storage unit installed within a containment accommodating the reactor vessel and configured to store coolant and air therein, the air within the spray coolant storage unit fluidly communicates with air within the containment such that the spray coolant storage unit maintains equilibrium of pressure between the spray coolant storage unit and with the containment,
a spray pipe that is installed within the containment in such a manner that when an accident occurs, the coolant supplied from the spray coolant storage unit is sprayed into the containment through the spray pipe due to an increase in pressure within the containment building, and
a connection pipe having one end inserted into the spray coolant storage unit to provide a flow path along which the coolant flows, and the other end connected to the spray pipe to supply the coolant passively to the spray pipe when the pressure within the containment increases due to an occurrence of an accident and a flow of the coolant occurs therein, and
a check valve installed in the spray pipe such that steam discharged into the containment or air is prevented from being introduced through the spray pipe into the connection pipe, the check valve being opened in a direction toward the spray pipe by a flow of the coolant from the spray coolant storage unit such that the coolant within the spray coolant storage unit flows through the spray pipe, wherein
the connection pipe includes:
an upward flow path portion inserted into the spray coolant storage unit and extending up to a predetermined height such that the flow of the coolant from the spray coolant storage unit to the spray pipe is prevented from occurring within a normal plant operation pressure range for the containment; and
a downward flow path portion extending downward from the upward flow path portion and connected to the spray pipe such that the coolant is supplied continuously to the spray pipe therethrough due to a difference of a gravitational head of water, and
the check valve is configured to form a pressure difference between an inside of the connection pipe and a target space of spraying in the containment until the check valve is opened when the flow of coolant occurs at a height of the upward flow path portion or above,
the passive containment spray system further comprises:
a diverged pipe having one end connected to the downward flow path portion and the other end exposed to air; and
an isolation valve installed in the diverged pipe, and configured to be opened by an operator to prevent an occurrence of the flow of the coolant from the spray coolant storage unit by forming an equilibrium of pressure between an inside of the connection pipe and an outsider of the connection pipe when a nuclear power plant is in a normal plant operation condition, or when the spray coolant storage unit is in maintenance,
an intermediate cavity unit installed around the other end of the connection pipe to enhance the flow of the coolant that occurs in a direction from the spray coolant storage unit to the connection pipe, the intermediate cavity unit generating a difference in pressure from the spray coolant storage unit, and connected to the spray pipe to supply the coolant that passes through the connection pipe to the spray pipe,
wherein the spray coolant storage unit and the intermediate cavity unit do not share a common wall.

* * * * *